US010421835B2

(12) United States Patent
Haruta et al.

(10) Patent No.: US 10,421,835 B2
(45) Date of Patent: Sep. 24, 2019

(54) POLYESTER FILM FOR SEALANT USE, LAMINATE, AND PACKAGING BAG

(71) Applicant: TOYOBO CO., LTD., Osaka-shi, Osaka (JP)

(72) Inventors: Masayuki Haruta, Tsuruga (JP); Kazuya Hiro, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 210 days.

(21) Appl. No.: 14/787,027

(22) PCT Filed: Apr. 23, 2014

(86) PCT No.: PCT/JP2014/061376
§ 371 (c)(1),
(2) Date: Oct. 26, 2015

(87) PCT Pub. No.: WO2014/175313
PCT Pub. Date: Oct. 30, 2014

(65) Prior Publication Data
US 2016/0108171 A1 Apr. 21, 2016

(30) Foreign Application Priority Data
Apr. 26, 2013 (JP) ................................ 2013-093364

(51) Int. Cl.
C08G 63/183 (2006.01)
B32B 27/36 (2006.01)
B32B 27/08 (2006.01)
B32B 27/32 (2006.01)
B32B 27/34 (2006.01)
C08J 5/18 (2006.01)
C09K 3/10 (2006.01)

(52) U.S. Cl.
CPC ............ *C08G 63/183* (2013.01); *B32B 27/08* (2013.01); *B32B 27/32* (2013.01); *B32B 27/34* (2013.01); *B32B 27/36* (2013.01); *C08J 5/18* (2013.01); *C09K 3/1006* (2013.01); *B32B 2307/31* (2013.01); *B32B 2307/518* (2013.01); *B32B 2307/702* (2013.01); *B32B 2307/704* (2013.01); *B32B 2439/70* (2013.01); *B32B 2439/80* (2013.01); *C08J 2367/02* (2013.01); *C08J 2467/02* (2013.01); *C09K 2200/0655* (2013.01)

(58) Field of Classification Search
CPC .......... B32B 2307/31; B32B 2307/518; B32B 2307/702; B32B 2307/704; B32B 2439/70; B32B 2439/80; B32B 27/08; B32B 27/32; B32B 27/34; B32B 27/36; C08G 63/183; C08J 2367/02; C08J 2467/02; C08J 5/18; C09K 2200/0655; C09K 3/1006
See application file for complete search history.

(56) References Cited

U.S. PATENT DOCUMENTS

| 2004/0009342 | A1  | 1/2004  | Janssens et al. |
| 2004/0213967 | A1  | 10/2004 | Peiffer et al. |
| 2004/0229060 | A1  | 11/2004 | Peiffer et al. |
| 2005/0019559 | A1  | 1/2005  | Peiffer et al. |
| 2005/0061708 | A1  | 3/2005  | Peiffer et al. |
| 2005/0074598 | A1  | 4/2005  | Peiffer et al. |
| 2005/0074599 | A1  | 4/2005  | Peiffer et al. |
| 2005/0074619 | A1  | 4/2005  | Peiffer et al. |
| 2008/0057236 | A1* | 3/2008  | Yamada .................. B32B 27/36 428/34.9 |
| 2009/0270584 | A1  | 10/2009 | Endo et al. |
| 2009/0304997 | A1  | 12/2009 | Haruta et al. |
| 2010/0003377 | A1  | 1/2010  | Brennan et al. |
| 2010/0247845 | A1  | 9/2010  | Haruta et al. |
| 2010/0256309 | A1  | 10/2010 | Endo et al. |
| 2011/0008607 | A1  | 1/2011  | Haruta et al. |
| 2012/0043248 | A1  | 2/2012  | Haruta et al. |
| 2013/0034673 | A1  | 2/2013  | Haruta et al. |

FOREIGN PATENT DOCUMENTS

| CN | 101500784 A  | 8/2009  |
| CN | 101573400 A  | 11/2009 |
| CN | 101808809 A  | 8/2010  |
| CN | 101918196 A  | 12/2010 |
| CN | 101970212 A  | 2/2011  |
| CN | 102448705 A  | 5/2012  |
| EP | 1 380 414 A1 | 1/2004  |
| EP | 1 165 317 B1 | 8/2004  |

(Continued)

OTHER PUBLICATIONS

JP 2005146112 A, Jun. 2005, Derwent Ab.*
JP 02048926 A, Feb. 1990, Derwent Ab.*
JP 2005146112 A, Jun. 2005, Machien translation.*
Japanese Patent Office, International Search Report in International Patent Application No. PCT/JP2014/061376 (dated Aug. 12, 2014).
Chinese Patent Office, Notification of First Office Action in Chinese Patent Application No. 201480023722.7 (dated Aug. 9, 2016).
European Patent Office, European Search Report in European Patent Application No. 14 788 511.5 (dated Apr. 12, 2006).

(Continued)

Primary Examiner — Satya B Sastri
(74) Attorney, Agent, or Firm — Leydig, Voit & Mayer, Ltd.

(57) ABSTRACT

The invention provides a polyester film for sealant use. The polyester film contains a polyester resin having ethylene terephthalate as a main structural component and including one or more monomer components that may serve as amorphous components so that the total amount of the monomer components are not less than 12 mol % and not more than 30 mol % among total monomer components. The polyester film is uniaxially or biaxially stretched, and has a particular heat-sealing strength and crystal melting heat capacity. The invention also provides a laminate including as at least one layer of the polyester film for sealant use, as well as a packaging bag that utilizes the laminate.

6 Claims, No Drawings

(56) References Cited

FOREIGN PATENT DOCUMENTS

| EP | 1 475 228 A2 | | 11/2004 |
|---|---|---|---|
| EP | 1 475 229 A2 | | 11/2004 |
| EP | 1 900 775 A1 | | 3/2008 |
| EP | 1 942 002 A2 | | 7/2008 |
| EP | 2 556 945 A1 | | 2/2013 |
| JP | S51-042748 A | | 4/1976 |
| JP | 02048926 A | * | 2/1990 |
| JP | H06-055717 A | | 3/1994 |
| JP | H07-132946 A | | 5/1995 |
| JP | H08-281893 A | | 10/1996 |
| JP | H11-000975 A | | 1/1999 |
| JP | 2002-256116 A | | 9/2002 |
| JP | 2005146112 A | * | 6/2005 |
| JP | 2009-227970 A | | 10/2009 |
| TW | 200631777 A | | 9/2006 |
| WO | WO 2007/093798 A1 | | 8/2007 |

OTHER PUBLICATIONS

European Patent Office, Communication Pursuant to Article 94(3) EPC in European Patent Application No. 14 788 511.5 (dated Apr. 28, 2006).

Chinese Patent Office, Decision of Rejection in Chinese Patent Application No. 201480023722.7 (dated Apr. 7, 2017).

European Patent Office, Communication Pursuant to Article 94(3) EPC in European Patent Application No. 14788511.5 (dated Nov. 14, 2017).

Taiwan Intellectual Property Office, 1$^{st}$ Office Action in Taiwanese Patent Application No. 103114959 (dated Jul. 3, 2017) English translation.

European Patent Office, Communication Pursuant to Article 94(3) EPC in European Patent Application No. 14788511.5 (dated Jan. 22, 2019).

* cited by examiner

POLYESTER FILM FOR SEALANT USE, LAMINATE, AND PACKAGING BAG

CROSS-REFERENCE TO RELATED APPLICATIONS

This patent application is the U.S. national phase of International Patent Application No. PCT/JP2014/061376, filed Apr. 23, 2014, which claims the benefit of Japanese Patent Application No. 2013-093364, filed on Apr. 26, 2013, which are incorporated by reference in their entireties herein.

TECHNICAL FIELD

The present invention relates to a polyester film having excellent heat-sealing strength, and particularly to a polyester film for sealant use which has excellent heat-sealing strength with a polyester film; a laminate and a packaging bag comprising the polyester film.

BACKGROUND ART

Laminated films obtained by heat-sealing or laminating a sealant film to a biaxially stretched film as a substrate film have been heretofore used in many of distribution commodities represented by food products, pharmaceutical products and industrial products. The innermost layer of a packaging material that forms packaging bags, lids and so on is provided with a sealant layer formed of a polyolefin resin such as polyethylene or polypropylene, or a copolymer resin such as ionomer, EMMA which exhibit high heat-sealing strength. These resins are known to be capable of achieving a high adhesive strength through heat-sealing, and easily adsorb various organic compounds.

An unstretched sealant film formed of a polyolefin resin as described in Patent Document 1 has excellent heat-sealing strength between polyolefin films. However, it has the disadvantage that heat-sealing strength with an unstretched polyester film and a biaxially stretched polyester film is low. A packaging material including a sealant layer formed of a polyolefin resin as the innermost layer, i.e. a layer that is in contact with the contents, has the disadvantage that it easily adsorbs oil and fat components and perfume components, so that the aroma and taste of the contents are easily changed. Some of components in the contents are unsuitable for packaging of chemical products, pharmaceutical products, food products and the like which contain organic compounds as effective components.

A packaging material including a sealant layer formed of an acrylonitrile resin as described in Patent Document 2 as the innermost layer, i.e. a layer that is in contact with the contents is suitable for packaging of chemical products, pharmaceutical products and food products which contain organic compounds as effective components. However, there is the disadvantage that the heat seal temperature must be increased for heat-sealing acrylonitrile films to each other. Further, there is the disadvantage that the heat-sealing strength with an unstretched polyester film and a biaxially stretched polyester film is low as in the case of the film in Patent Document 1.

PRIOR ART DOCUMENTS

Patent Documents

Patent Document 1: JP-A-2002-256116
Patent Document 2: JP-A-7-132946

SUMMARY OF THE INVENTION

Problems to be Solved by the Invention

An object of the present invention is to solve the problems of conventional techniques as described above. That is, the present invention is intended to provide a polyester film for sealant use which has not only high heat-sealing strength between the polyester films according to the present invention but also excellent heat-sealing strength with other unstretched polyester film and other biaxially stretched polyester film and which is hard to adsorb various organic compounds and has excellent hygienic properties. The present invention is also intended to provide a laminate including as at least one layer of the polyester film for sealant use and a packaging bag using the laminate.

Solutions to the Problems

That is, the present invention has the following constitutions.
1. A polyester film for sealant use, comprising
    a polyester resin having ethylene terephthalate as a main structural component and including one or more monomer components that may serve as amorphous components so that the total amount of the monomer components being not less than 12 mol % and not more than 30 mol % among total monomer components,
    wherein, the polyester film is uniaxially or biaxially stretched, and satisfies the following requirements (1) to (4):
    (1) the heat-sealing strength is not less than 2 N/15 mm and not more than 20 N/15 mm when the polyester films are heat-sealed to each other at 130° C.;
    (2) the heat-sealing strength is not less than 2 N/15 mm and not more than 8 N/15 mm when the polyester film is heat-sealed to other biaxially stretched polyester film formed of a crystalline polyester at 130° C.;
    (3) the heat-sealing strength is not less than 2 N/15 mm and not more than 20 N/15 mm when the polyester film is heat-sealed to other unstretched polyester film formed of a crystalline polyester at 130° C.; and
    (4) the crystal melting heat capacity ΔHm measured by differential scanning calorimetry (DSC) is not less than 10 (J/g) and not more than 40 (J/g).
2. A laminate comprising as at least one layer the polyester film for sealant use according to the above 1.
3. The laminate according to the above 2, wherein at least one of layers other than the polyester film for sealant use is a polyester film formed of a crystalline polyester, a polyolefin film or a polyamide film.
4. A packaging bag, wherein the laminate according to the above 2 or 3 is used as at least a part thereof.

Effects of the Invention

The polyester film according to the present invention has not only high heat-sealing strength between the polyester films according to the present invention but also excellent heat-sealing strength with other unstretched polyester film and other biaxially stretched polyester film. Further, there may be provided a stretched polyester film for sealant use which is hard to adsorb various organic compounds and is hygienic. Further, there may be provided a laminate including as at least one layer the polyester film for sealant use and a packaging bag using the laminate.

MODE FOR CARRYING OUT THE INVENTION

The polyester film according to the present invention is a film having excellent heat-sealability. The polyester film is a film for sealant use which has satisfactory heat-sealability particularly with a biaxially stretched polyester film and an unstretched polyester film that are formed of a crystalline polyester. The polyester film is hard to adsorb various organic compounds, so that a sealant material suitable as a packaging material may be provided. The polyester film may be printed, or may be not printed. It is also preferable that the polyester film is laminated with other film by heat-sealing or lamination, and used as a packaging bag. Hereinafter, the polyester film according to the present invention will be described.

The polyester to be used in the polyester film according to the present invention contains an ethylene terephthalate unit as a main constituent component. The content of the ethylene terephthalate unit is preferably not less than 50 mol %, more preferably not less than 60 mol % in 100 mol % of constituent units of the polyester. In the present invention, examples of other dicarboxylic acid components that forms the polyester may include aromatic dicarboxylic acids such as isophthalic acid, naphthalene dicarboxylic acid and orthophthalic acid; aliphatic dicarboxylic acids such as adipic acid, azelaic acid, sebacic acid and decanedicarboxylic acid; and cycloaliphatic dicarboxylic acids.

Preferably, the polyester does not contain a polyvalent carboxylic acid with a valence number of 3 or more (e.g. trimellitic acid, pyromellitic acid and anhydrides thereof, etc.)

Examples of the diol component that forms the polyester may include aliphatic diols such as ethylene glycol, 1,3-propanediol, 1,4-butanediol, neopentyl glycol and hexanediol; cycloaliphatic diols such as 1,4-cyclohexanedimethanol; and aromatic diols such as bisphenol A.

The polyester to be used in the present invention is preferably a polyester adjusted to have a glass transition temperature (Tg) of 60 to 70° C. by including one or more of cyclic diols such as 1,4-cyclohexanedimethanol and diols with a carbon number of 3 to 6 (e.g. 1,3-propanediol, 1,4-butanediol, neopentyl glycol, hexanediol and the like).

In the polyester, the total amount of one or more monomer components that may serve as amorphous components is not less than 15 mol %, preferably not less than 16 mol %, more preferably not less than 17 mol %, especially preferably not less than 18 mol % among total monomer components (in 100 mol % of polyhydric alcohol components or 100 mol % of polyvalent carboxylic acid components in polyester resin). The upper limit of the total amount of monomer components that may serve as amorphous components is 30 mol %.

The crystal melting heat capacity of the polyester film may be controlled by the composition of a resin that forms the film, and film formation conditions such as a heat setting temperature and a stretch ratio. The crystal melting heat capacity, details of which will be described later, is a value which is obtained by DSC measurement, and indicates an abundance of crystals in the film (oriented crystals during film formation and cold crystallization during elevation of temperature). When the content of amorphous components is not more than 15 mol %, there is a large amount of crystalline components in the resin that forms the film. Therefore, even though the molten resin is rapidly cooled and solidified after being extruded from a die, crystallization cannot be accurately controlled since the crystallization speed is excessively high. Thus, in this case, even when film formation conditions such as a heat setting temperature and a stretch ratio are changed, the degree of crystallinity can no longer be kept low. Therefore, it is not preferable since it is difficult to keep the crystal melting heat capacity at not more than 40 (J/g). The upper limit of the total amount of amorphous components is not particularly limited, but it is preferably not more than 30 mol %. When the content of amorphous components is not less than 30 mol %, the crystal melting heat capacity of the film can be kept at not more than 40 (J/g) by appropriately selecting film formation conditions, but thickness unevenness of the film increases, which leads to deterioration of productivity. The content of amorphous components being not less than 30 mol % is not preferable because heat resistance is reduced, so that blocking occurs at the periphery of a sealed part (phenomenon that the film is sealed over a range wider than intended due to heat conduction from a heating member) during heat-sealing, and therefore it is difficult to properly heat-seal the film.

The crystal melting heat capacity ΔHm may be controlled by a heat setting temperature and stretch conditions during formation of the polyester film except for adjustment of the composition of the resin to be used in the polyester film described above. A film formation method ensuring that the crystal melting heat capacity ΔHm of the polyester film is not less than 10 (J/g) and not more than 40 (J/g) will be described later.

Examples of the monomer that may serve as an amorphous component may include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol and hexanediol. Among them, when neopentyl glycol, 1,4-cyclohexanedimethanol or isophthalic acid is used as a monomer that may serve as an amorphous component of the polyester film, an increase in degree of crystallinity is suppressed at the time of rapidly cooling and solidifying the resin from a heat-molten state during film formation, so that the degree of crystallinity becomes low. Therefore, by appropriately changing film formation conditions such as a heat setting temperature and a stretch ratio in the subsequent film formation step, the degree of crystallinity may be kept low, so that it is easy to keep the crystal melting heat capacity at not more than 40 (J/g). That is preferable.

Preferably, the polyester does not contain a diol with a carbon number of 8 or more (e.g. octanediol or the like), or a polyhydric alcohol with a valence number of 3 or more (e.g. trimethylol propane, trimethylol ethane, glycerin, diglycerin or the like). Preferably, the content of diethylene glycol, triethylene glycol and polyethylene glycol, which are by-products during polymerization, in the polyester is as low as possible.

In the resin that forms the polyester film according to the present invention, various kinds of additives such as a wax, an antioxidant, an antistatic agent, a crystal nucleating agent, a viscosity reducing agent, a heat stabilizer, a coloring pigment, an anti-coloring agent and an ultraviolet absorber may be added as necessary. Preferably, fine particles are added as a lubricant that improves the operability (slippage) of the film. Fine particles may be arbitrarily selected, and examples thereof may include inorganic fine particles such as those of silica, alumina, titanium dioxide, potassium carbonate, kaolin and barium sulfate; and organic fine particles such as acrylic resin particles, melamine resin particles, silicone resin particles and crosslinked polystyrene particles. The average particle size of the fine particles is within the range of 0.05 to 3.0 μm (as measured by a Coulter counter), and may be appropriately selected as necessary.

As a method for blending the particles in the resin that forms the polyester film, for example, the particles may be added at any stage in production of a polyester resin.

However, it is preferable that the particles are added in the form of a slurry with the particles dispersed in ethylene glycol etc. at a stage of esterification or at a stage after the completion of ester exchange reaction and before the start of polycondensation reaction, thereafter the polycondensation reaction is carried out. A method is also preferable in which a slurry of particles dispersed in ethylene glycol, water or the like and a polyester resin raw material are blended using a kneading extruder with a vent, or dried particles and a polyester resin raw material are blended using a kneading extruder.

Further, the polyester film according to the present invention may also be subjected to a corona treatment, a coating treatment, a flame treatment or the like for improving the adhesiveness of the film surface.

Properties required for the polyester film for sealant use according to the present invention will now be described.

First, the polyester film according to the present invention has a heat-sealing strength of preferably not less than 2 N/15 mm and not more than 20 N/15 mm when the polyester films are heat-sealed to each other at 130° C. The heat-sealing strength being less than 2 N/15 mm is not preferable because the films are easily peeled from each other. The heat-sealing strength is preferably not less than 2.5 N/15 mm, more preferably not less than 3 N/15 mm. While the heat-sealing strength is preferably high, the currently achievable upper limit is about 20 N/15 mm.

The degree of crystallinity is preferably low for obtaining a film having high heat-sealing strength. When the degree of crystallinity is low (i.e. the content of non-crystals is high), non-crystals may be softened by heating, leading to an increase in heat-sealing strength. Generally, the degree of crystallinity of a film increases when the film is stretched. Therefore, unstretched films of polypropylene and so on have been mainly used as sealant materials for heat-sealing. However, unstretched films are inferior to stretched films in productivity and mechanical strength. Thus, the present inventors have conducted studies on the assumption that a film having a low degree of crystallinity even when stretched would be better in heat-sealing strength after the film is stretched. As a result, it has been found that a film with a sufficiently low degree of crystallinity, which is good in heat-sealing strength after it is stretched, is obtained by controlling a measured value of the crystal melting heat capacity $\Delta Hm$ in DSC measurement to fall within a specific range by using an amorphous monomer in a certain ratio as a raw material of a polyester film.

Here, the multilayer polyester film in the present invention has a crystal melting heat capacity $\Delta Hm$ of preferably not less than 10 (J/g) and not more than 40 (J/g), further preferably not less than 15 (J/g) and not more than 35 (J/g) as measured in DSC measurement. The magnitude of the crystal melting heat capacity $\Delta Hm$ in DSC measurement indicates an abundance of crystals in the film (oriented crystals during film formation). The crystal melting heat capacity $\Delta Hm$ being less than 10 (J/g) is not preferable because the film is amorphous and thus lacks mechanical strength, and the film is poor in processability. Also, the crystal melting heat capacity $\Delta Hm$ being less than 10 (J/g) is not preferable because heat resistance is reduced, so that blocking occurs at the periphery of a sealed part (phenomenon that the film is sealed over a range wider than intended due to heat conduction from a heating member) during heat-sealing, and therefore it is difficult to properly heat-seal the film. Further, the melting heat capacity being less than 10 (J/g) is not preferable because the film is activated even under the normal environmental temperature condition, so that blocking easily occurs in which films stick to each other during storage of the film, and particularly blocking easily occurs when the film is stored at a high temperature in the summer season with the film wound-up in the form of a roll. On the other hand, the crystal melting heat capacity $\Delta Hm$ being more than 40 (J/g) is not preferable because the heat-sealing strength is reduced when the polyester films of the present invention are heat-sealed to each other, the polyester film of the present invention is heat-sealed to other biaxially stretched polyester film formed of a crystalline polyester, and the polyester film is heat-sealed to other unstretched polyester film formed of a crystalline polyester. This is because the degree of crystallinity becomes excessively high, so that the film lacks flexibility.

The polyester film according to the present invention has a heat-sealing strength of preferably not less than 2 N/15 mm and not more than 8 N/15 mm when the polyester film is heat-sealed at 130° C. to other biaxially stretched polyester film produced using a crystalline polyester. The heat-sealing strength being less than 2 N/15 mm is not preferable because the films are easily peeled from each other. The heat-sealing strength is preferably not less than 2.5 N/15 mm, more preferably not less than 3 N/15 mm. Although the heat-sealing strength is preferably high, the currently achievable upper limit is about 8 N/15 mm.

The polyester film according to the present invention has a heat-sealing strength of preferably not less than 2 N/15 mm and not more than 20 N/15 mm when the polyester film is heat-sealed at 130° C. to other unstretched polyester film produced using a crystalline polyester. The heat-sealing strength being less than 2 N/15 mm is not preferable because the films are easily peeled from each other. The heat-sealing strength is preferably not less than 2.5 N/15 mm, more preferably not less than 3 N/15 mm. Although the heat-sealing strength is preferably high, the currently achievable upper limit is about 20 N/15 mm.

In the polyester film according to the present invention, the thickness of the film is not particularly limited, but it is preferably not less than 3 μm and not more than 200 μm. The thickness of the film being less than 3 μm is not so preferable because the heat-sealing strength may be insufficient, and processing such as printing may be difficult. Although the thickness of the film may be more than 200 μm, but it is not preferable because the weight of the film used increases, leading to an increase in chemical costs. The thickness of the film is preferably not less than 5 μm and not more than 190 μm, more preferably not less than 7 μm and not more than 180 μm.

The above-mentioned polyester film according to the present invention may be obtained by melt-extruding the polyester raw material through an extruder to form an unstretched film, and uniaxially or biaxially stretching the unstretched film using a predetermined method as shown below. The polyester may be obtained by selecting a type and amount of each of a dicarboxylic acid component and a diol component so that the polyester contains an appropriate amount of monomers that may serve amorphous components, and subjecting the components to polycondensation. Two or more chip-shaped polyesters may be mixed and used as a raw material of the film.

In melt-extrusion of a raw material resin, it is preferable to dry a polyester raw material using a dryer such as a hopper dryer or a paddle dryer, or a vacuum dryer. After the polyester raw material is dried in this manner, it is melted at a temperature of 200 to 300° C., and extruded into a film shape. In extrusion, any existing method such as a T-die method or a tubular method may be employed.

An unstretched film may be obtained by rapidly cooling the extruded sheet-shaped molten resin. As a method for rapidly cooling the molten resin, a method may be suitably employed in which the molten resin is cast onto a rotating drum from a mouthpiece, and rapidly cooled and solidified to obtain a substantially unoriented resin sheet.

The stretch direction of the film may be one of the longitudinal (long) direction and the transverse (lateral) direction of the film. Hereinafter, a sequential biaxial stretching method by longitudinal stretching-transverse stretching in which longitudinal stretching is first performed, and transverse stretching is then performed will be described. However, this order may be reversed to perform transverse stretching-longitudinal stretching because only the main orientation direction is changed. The stretching method may also be a simultaneous biaxial stretching method.

In stretching in the longitudinal direction, it is practical to introduce an unstretched film into a longitudinal stretching machine with a plurality of rolls arranged serially. For longitudinal stretching, it is preferable to perform preheating with a preheat roll until the film temperature reaches 65° C. to 90° C. The film temperature being lower than 65° C. is not preferable because the film is hard to be stretched (i.e. rupture easily occurs) when the film is stretched in the longitudinal direction. The film temperature being higher than 90° C. is not preferable because the film easily sticks to the roll, so that contamination of the roll in continuous production is accelerated.

When the film temperature reaches to the above range, longitudinal stretching is performed. It is practical to set the longitudinal stretch ratio to not less than 1 and not more than 5. Since the longitudinal stretch ratio of 1 means that longitudinal stretching is not performed, the longitudinal stretching ratio is set to 1 for obtaining a transversely uniaxially stretched film, and longitudinal stretching is performed at a ratio of not less than 1.1 for obtaining a biaxially stretched film. The upper limit of the longitudinal stretch ratio is not limited, but it is preferably not more than 5 because when the longitudinal stretch ratio is excessively high, it is difficult to perform transverse stretching (i.e. rupture occurs). Preferably, the film is once cooled after longitudinal stretching. Preferably, the film is cooled with a cooling roll having a surface temperature of 20 to 40° C.

Preferably, transverse stretching is then performed at a stretch ratio of about 3.5 to 5 at 65° C. to 100° C. with the film gripped at both end edges in the lateral direction in a tenter. Preferably, the film is preheated before being stretched in the transverse direction, and it is practical to preheat the film until the film surface temperature reaches 75° C. to 110° C.

It is preferable that after transverse stretching, the film is made to pass through an intermediate zone where active heating operation is not performed. When there is a difference in temperature between a transverse stretching zone and an intermediate heat treatment zone in the tenter, film quality may not be stabilized because heat of the intermediate heat treatment zone (hot air itself and radiant heat) flows into the transverse stretching step, so that the temperature of the transverse stretching zone is not stabilized. Therefore, it is preferable that the film after transverse stretching and before intermediate heat treatment is made to pass through the intermediate zone over a predetermined period of time, and after that intermediate heat treatment is performed. In the intermediate zone, a film of stable quality is obtained by blocking an accompanying flow associated with the running of the film and hot air from the transverse stretching zone and the intermediate heat treatment so that when a strip-shaped paper piece is suspended, the paper piece hangs down almost completely in the vertical direction. It suffices that the passage time through the intermediate zone is about 1 second to 5 seconds. When the passage time is less than 1 second, the length of the intermediate zone becomes insufficient, so that a sufficient effect of blocking heat is not obtained. The intermediate zone is preferably long, but when the intermediate zone is excessively long, the size of equipment increases, and therefore it suffices that the passage time is about 5 seconds.

As described above, the crystal melting heat capacity ΔHm may be controlled by a heat treatment temperature and stretch conditions during formation of the polyester film in addition to adjustment of the composition of the resin to be used in the polyester film. As the heat treatment temperature decreases, the degree of crystallinity of the polyester film becomes lower, and the value of ΔHm decreases. As a result, the heat-sealing strength is improved when the polyester films according to the present invention are heat-sealed to each other, the polyester film according to the present invention is heat-sealed to other biaxially stretched polyester film formed of a crystalline polyester, and the polyester film is heat-sealed to other unstretched polyester film formed of a crystalline polyester.

Preferably, the heat treatment is performed at 160° C. or higher after the film passes through the intermediate zone. Conventionally, when the heat treatment was performed at a temperature higher than 130° C., crystallization of the polyester film progressed in the film formation step, so that crystal melting heat capacity ΔHm in DSC measurement increased. Therefore, it has been considered that the heat treatment temperature was preferably not higher than 130° C. because otherwise, sufficient heat-sealing strength cannot be obtained in any of the cases where the polyester films according to the present invention are heat-sealed to each other, the polyester film according to the present invention is heat-sealed to other biaxially stretched polyester film formed of a crystalline polyester, and the polyester film is heat-sealed to other unstretched polyester film formed of a crystalline polyester. However, contrary to the past prediction, it has been found that the degree of crystallinity of the polyester film is reduced by performing the heat treatment at 160° C. or higher which is higher than the melting starts temperature, so that the heat-sealing strength increases. This is because when the heat treatment is performed at a temperature higher than the melting start temperature, the orientation of molecular chains in the film is disordered, and resultantly the degree of crystallinity is reduced. It is supposed that as a result, the crystal melting heat capacity ΔHm may be reduced although the heat treatment is performed at a high temperature of 160° C. or higher. Further, by performing the heat treatment at a high temperature of 160° C. or higher, an ideal film may be obtained which has properties such as resistance to a reduction in shrinkage ratio and a good dead hold, which could not be achieved in the heat treatment at 130° C.

The passage time through the heat treatment zone is preferably not less than 2 seconds and not more than 20 seconds. The residence time in the heat treatment zone is preferably longer, and is preferably 2 seconds or more, further preferably 5 seconds or more, but it suffices that the residence time is about 20 seconds.

Thereafter, the film is wound while both ends of the film are cut and removed, so that a polyester film roll is obtained.

EXAMPLES

Hereinafter, the present invention will be described more in detail by way of examples, but the present invention is not limited to the embodiment of the examples and may be changed appropriately without departing from a purpose of the present invention.

<Preparation of Polyester Raw Material>

Synthesis Example 1

To a stainless steel autoclave equipped with a stirrer, a thermometer and a partially circulating cooler, dimethyl terephthalate (DMT) 100 mol % as a dicarboxylic acid component and ethylene glycol (EG) 100 mol % as a polyhydric component were added in such a manner that the amount of ethylene glycol was 2.2 times the amount of dimethyl terephthalate in terms of a molar ratio. An ester exchange reaction was carried out using of zinc acetate 0.05 mol % (based on the acid component) as an ester exchange catalyst while generated methanol was distilled away to outside of the system. Thereafter, antimony trioxide 0.225 mol % (based on the acid component) was added as a polycondensation catalyst, and a polycondensation reaction was carried out at 280° C. under a reduced pressure of 26.7 Pa to obtain a polyester (A) having an intrinsic viscosity of 0.75 dl/g. This polyester is polyethylene terephthalate.

Synthesis Example 2

The same procedure as in Synthesis Example 1 was carried out to obtain polyesters (B) to (E) as shown in Table 1. In the table, TPA means terephthalic acid, BD means 1,4-butanediol, NPG means neopentyl glycol, CHDM means 1,4-cyclohexanedimethanol, and DEG means diethylene glycol. In production of the polyester (E), $SiO_2$ (Silysia 266 manufactured by FUJI SILYSIA CHEMICAL LTD.) was added in a ratio of 7,000 ppm to the polyester. The intrinsic viscosities of polyesters B, C, D and E were 0.72 dl/g, 0.80 dl/g, 1.20 dl/g and 0.75 dl/g, respectively. Each polyester was appropriately formed into a chip. The compositions of the polyesters are shown in Table 1.

TABLE 1

| Polyester raw materials | Composition of the raw materials for polyesters (mol %) | | | | | | Additive amount of lubricant (ppm) |
|---|---|---|---|---|---|---|---|
| | Acid components | Polyhydric alcohol components | | | | | |
| | TPA | EG | BD | NPG | CHDM | DEG | |
| A | 100 | 99 | — | — | — | 1 | — |
| B | 100 | 68 | — | 30 | — | 2 | — |
| C | 100 | 67 | — | — | 30 | 3 | — |
| D | 100 | — | 100 | — | — | — | — |
| E | 100 | 99 | — | — | — | 1 | 7000 |

A method for evaluating a polyester film is shown below.

[Heat-Sealing Strength]

The sealing strength was measured in accordance with JIS Z1707. Specific procedures are briefly described below. Surfaces of samples that had not been subjected to a coating treatment, a corona treatment or the like were bonded to each other using a heat sealer. The bonded sample was measured for the T-shape peeling strength using a tensile strength tester (manufactured by TOYO SOKKI CO., LTD.; trade name: Tensilon UTM). At this time, the sealing pressure was 10 N/cm², the sealing time was 2 seconds, the sealing temperature was 130° C. and 150° C., the tension speed when measuring was 200 mm/minute, and the test piece width was 15 mm. The unit is N/15 mm.

The biaxially stretched polyester film which is used at the heat-sealing strength measurement with other biaxially stretched polyester film is E5100-12 μm (manufactured by TOYOBO CO., LTD.). The unstretched polyester film which is used at the heat-sealing strength measurement with other unstretched polyester film is A-PET-30 μm (manufactured by TOYOBO CO., LTD.).

[Crystal Melting Heat Capacity (ΔHm)]

The heat capacity of a fusion was measured using a DSC (DSC 220 manufactured by Seiko Instruments Inc.). Specifically, 10 mg of a film sample was weighed and taken in an aluminum pan, and heated at a temperature rise rate of 5° C./minute from 20° C. to about 250° C., and an heat amount shown by an area (melting peak area) surrounded by an endothermic peak and a baseline was defined as a heat capacity of a fusion of the film sample.

[Aroma Retainability]

A film was cut into squares of 10 cm×10 cm, and two of the cut films were superimposed on each other, and heat-sealed on three sides at 130° C. to prepare a bag open on only one side. Put were predetermined substances (limonene manufactured by NACALAI TESQUE, INC. and menthol manufactured by NACALAI TESQUE, INC., 20 g) into the bag, and the bag was heat-sealed on the open side to prepare a sealed bag. The bag was put in a glass container with a capacity of 1000 ml, and a lid was put on the glass container. After one week, the lid of the glass container was opened so that persons (total 16 persons with 4 persons in twenties, 4 persons in thirties, 4 persons in forties and 4 persons in fifties; the ratio of men to women was 1:1 in each age category) could smell the air in the glass container. The air in the glass container was smelled, and evaluations were made as follows.

Rate "○": the number of persons who sensed a smell 0 to 1

Rate "Δ": the number of persons who sensed a smell 2 to 3

Rate "×": the number of persons who sensed a smell 4 to 16

[Adsorptivity]

A film was cut into a square of 10 cm×10 cm, and a weight of the film was measured. Next, the film was immersed in a container charged with 500 ml of a predetermined substance (solution obtained by dissolving limonene manufactured by NACALAI TESQUE, INC. and menthol manufactured by NACALAI TESQUE, INC. in ethanol in a concentration of 30%), and was taken out after one week. The film that was taken out was pressed with Bemcot to remove water, and dried in a room at a temperature of 23° C. and a humidity of 60% RH for one day, and a weight of the film was then measured. A difference in film weight determined from the following equation (1) at this time was defined as an adsorptivity.

$$\text{Adsorptivity} = \text{film weight after immersion} - \text{film weight before immersion} \qquad \text{Equation (1)}$$

The adsorptivity was evaluated as follows.

Rate "○": not less than 0 mg and not more than 5 mg

Rate "Δ": more than 5 mg and not more than 10 mg

Rate "×": more than 10 mg

[Evaluation Film]

The used films except the films shown in examples of the present application were a commercially available 30 μm-thick unstretched polypropylene film for sealant use and a commercially available 30 μm-thick polyacrylonitrile film for sealant use.

Example 1

The above-mentioned polyester A, polyester B, polyester D and polyester E were mixed in a mass ratio of 5:66:24:5, and introduced into an extruder. Thereafter, the mixed resin was melted at 280° C., extruded from a T-die, and wound around a rotating metallic roll cooled to a surface temperature of 30° C., so that the mixed resin was rapidly cooled, thereby obtaining a 420 µm-thick unstretched film was obtained. The take-over speed of the unstretched film (rotation speed of the metallic roll) at this time was about 20 m/min. Thereafter, the unstretched film was guided into a longitudinal stretching machine with a plurality of rolls arranged serially, and was preheated on a preheating roll until the film temperature reached 78° C. The film was then stretched at a ratio of 3.5. Thereafter, the longitudinally stretched film was forcibly cooled by a cooling roll set at a surface temperature of 25° C.

The cooled film after longitudinal stretching was guided into a transverse stretching machine. In the transverse stretching machine, preheating was first performed until the film temperature reached 90° C., and the film was stretched in the transverse direction at a ratio of 4 at 85° C. Thereafter, the film was made to pass through the intermediate zone where hot air from the stretching zone and hot air from the heat treatment zone were cut off (passing-through time=about 1.2 seconds), and the film was then guided into the heat treatment zone. The film was heat-treated at a temperature of 95° C. for 10 seconds to obtain a 30 µm-thick biaxially stretched film roll. The properties of the obtained film were evaluated by the methods described above. The evaluation results are shown in Table 3. The film was excellent in all of heat-sealing strength, aroma retainability and adsorptivity.

Example 2

Except that the thickness of the unstretched film was changed from 420 µm to 280 µm so that the thickness of the biaxially stretched film was changed from 30 µm to 20 µm, the same procedure as in Example 1 was carried out to obtain a 20 µm-thick biaxially stretched film roll. The properties of the obtained film were evaluated by the above-described methods. The evaluation results are shown in Table 3. The film was excellent like the film of Example 1.

Example 3

Except that the thickness of the unstretched film was changed from 420 µm to 180 µm, and the stretch ratio in the longitudinal direction was changed from 3.5 to 1.5, the same procedure as in Example 1 was carried out to obtain a 30 µm-thick biaxially stretched film roll. The properties of the obtained film were evaluated by the above-described methods. The evaluation results are shown in Table 3. The film was preferable in that it had higher heat-sealing strength as compared to Example 1.

Example 4

Except that the heat-treated temperature after transverse stretching was changed from 95° C. to 120° C., the same procedure as in Example 1 was carried out to obtain a 30 µm-thick biaxially stretched film roll. The properties of the obtained film were evaluated by the above-described methods. The evaluation results are shown in Table 3. The heat-sealing strength at 130° C. was slightly lower than that of Example 1, however, the film was preferable comprehensively.

Example 5

Except that the thickness of the unstretched film was changed from 420 µm to 120 µm, longitudinal stretching was not performed and the temperature while the transverse stretching was changed from 85° C. to 75° C., the same procedure as in Example 1 was carried out to obtain a 30 µm-thick uniaxially stretched film roll. The properties of the obtained film were evaluated by the above-described methods. The evaluation results are shown in Table 3. The film was preferable in that it had higher heat-sealing strength as compared to Example 1.

Example 6

Except that the raw material B was replaced by the raw material C, the same procedure as in Example 1 was carried out to obtain a 30 µm-thick biaxially stretched film roll. The properties of the obtained film were evaluated by the above-described methods. The evaluation results are shown in Table 3. The film had a high heat-sealing strength, thus it was excellent like the film of Example 1.

Example 7

Except that the mass ratio of the raw material A and the raw material B was changed, and an amount of monomers at amorphous components part was changed, the same procedure as in Example 1 was carried out to obtain a 30 µm-thick biaxially stretched film roll. The properties of the obtained film were evaluated by the above-described methods. The evaluation results are shown in Table 3. The heat-sealing strength was slightly lower than that of Example 1, however, the film was practically satisfied.

Example 8

Except that the raw material A was not used, the ratio of the raw material B was increased, and an amount of monomers at amorphous components part was changed, the same procedure as in Example 1 was carried out to obtain a 30 µm-thick biaxially stretched film roll. The properties of the obtained film were evaluated by the above-described methods. The evaluation results are shown in Table 3. The film was preferable in that it had higher heat-sealing strength as compared to Example 1.

Example 9

Except that the heat-treated temperature after transverse stretching was changed from 95° C. to 170° C., the same procedure as in Example 1 was carried out to obtain a 30 µm-thick biaxially stretched film roll. The properties of the obtained film were evaluated by the above-described methods. The evaluation results are shown in Table 3. The heat-sealing strength at 130° C. was slightly lower than that of Example 1, however, the film was preferable comprehensively.

Comparative Example 1

The ratio of the raw material A and the raw material B was changed, and the amount of monomers that could serve as amorphous components in the polyester forming the film was reduced to 10.5 mol %. Except for these changes, the same procedure as in Example 1 was carried out to obtain a 30 biaxially stretched film roll. The properties of the obtained film were evaluated by the above-described methods. The evaluation results are shown in Table 3.

Since the film of Comparative Example 1 had a reduced amount of amorphous component monomers in the polyester, it had a large melting heat capacity and high crystallinity. That made the heat-sealing strength much lower than the film of Example 1, and the film was inferior to the film of Example 1.

Comparative Example 2

Evaluations were made by the above-described methods using a commercially available 30 μm-thick unstretched polypropylene film for sealant use. The evaluation results are shown in Table 3. The film of Comparative Example 2 had satisfactory heat-sealing strength between the films, but had low heat-sealing strength with other biaxially stretched polyester film and other unstretched polyester film, and was inferior to the film of Example 1. Further, the film was inferior in aroma retainability to the film of Example 1.

Comparative Example 3

Evaluations were made by the above-described methods using a commercially available 30 μm-thick polyacrylonitrile film for sealant use. The evaluation results are shown in Table 3. The film of Comparative Example 3 had low heat-sealing strength between the films at 130° C., and low heat-sealing strength with other biaxially stretched polyester film and other unstretched polyester film, and was inferior to the film of Example 1.

TABLE 2

| | | | Stretching/heat treatment conditions | | | | | |
|---|---|---|---|---|---|---|---|---|
| | Ratio of raw materials (% by mass) | Amount of amorphous component monomers (mol %) | Longitudinal stretching | | Transverse stretching | | Heat treatment Temperature (° C.) | Film thickness (μm) |
| | | | Preheating temperature (° C.) | Ratio | Preheating temperature (° C.) | Ratio | | |
| Example 1 | A/B/D/E = 5/66/24/5 | 19.8 | 78 | 3.5 | 85 | 4 | 95 | 30 |
| Example 2 | A/B/D/E = 5/66/24/5 | 19.8 | 78 | 3.5 | 85 | 4 | 95 | 20 |
| Example 3 | A/B/D/E = 5/66/24/5 | 19.8 | 78 | 1.5 | 85 | 4 | 95 | 30 |
| Example 4 | A/B/D/E = 5/66/24/5 | 19.8 | 78 | 3.5 | 85 | 4 | 120 | 30 |
| Example 5 | A/B/D/E = 5/66/24/5 | 19.8 | No longitudinal stretching | | 75 | 4 | 95 | 30 |
| Example 6 | A/C/D/E = 5/66/24/5 | 19.8 | 78 | 3.5 | 85 | 4 | 95 | 30 |
| Example 7 | A/B/D/E = 21/50/24/5 | 15 | 78 | 3.5 | 85 | 4 | 95 | 30 |
| Example 8 | B/D/E = 80/15/5 | 24 | 78 | 3.5 | 85 | 4 | 95 | 30 |
| Example 9 | A/B/D/E = 5/66/24/5 | 19.8 | 78 | 3.5 | 85 | 4 | 170 | 30 |
| Comparative Example 1 | A/B/D/E = 36/35/24/5 | 10.5 | 78 | 3.5 | 85 | 4 | 95 | 30 |
| Comparative Example 2 | Commercially available 30 μm-thick unstretched polypropylene film for sealant use | | | | | | | 30 |
| Comparative Example 3 | Commercially available 30 μm-thick polyacrylonitrile film for sealant use | | | | | | | 30 |

TABLE 3

| | Film properties | | | | | | | | | | |
|---|---|---|---|---|---|---|---|---|---|---|---|
| | Heat-sealing strength (N/15 mm) | | | | | | Heat capacity of a fusion | Aroma retainability | | Adsorptivity | |
| | Strength between obtained films | | Strength with other biaxially stretched polyester film | | Strength with other unstretched polyester film | | | | | | |
| | 130° C. | 150° C. | 130° C. | 150° C. | 130° C. | 150° C. | Δ Hm (J/g) | Limonene | Menthol | Limonene | Menthol |
| Example 1 | 10.1 | 18.5 | 3 | 3.5 | 14.9 | 22.9 | 28 | ○ | ○ | ○ | ○ |
| Example 2 | 8.7 | 11.4 | 2.4 | 2.8 | 11 | 13.7 | 28 | ○ | ○ | ○ | ○ |
| Example 3 | 13.1 | 19.2 | 3.8 | 6.4 | 16.5 | 24 | 23 | ○ | ○ | ○ | ○ |
| Example 4 | 8.1 | 19.5 | 2.8 | 3.3 | 10.2 | 23.4 | 34 | ○ | ○ | ○ | ○ |
| Example 5 | 14.5 | 19.5 | 4.2 | 6.7 | 12.6 | 17.5 | 16 | ○ | ○ | ○ | ○ |
| Example 6 | 12.5 | 21 | 2.5 | 4 | 17 | 24 | 23 | ○ | ○ | ○ | ○ |
| Example 7 | 5.5 | 11 | 2 | 2.5 | 7.5 | 14.5 | 28 | ○ | ○ | ○ | ○ |
| Example 8 | 17.5 | 23 | 6.5 | 8.5 | 19.5 | 24.5 | 21 | ○ | ○ | ○ | ○ |
| Example 9 | 9 | 16.8 | 2.2 | 3 | 9.8 | 18.5 | 31 | ○ | ○ | ○ | ○ |
| Comparative Example 1 | 1.6 | 6.5 | 0.7 | 1.8 | 4.5 | 9 | 45 | ○ | ○ | ○ | ○ |
| Comparative Example 2 | 6.5 | 17.5 | 0 | 0 | 0 | 0 | 5 | x | x | ○ | ○ |
| Comparative Example 3 | 0.1 | 9.7 | 0.5 | 1.5 | 0 | 0 | — | ○ | ○ | ○ | ○ |

INDUSTRIAL APPLICABILITY

The present invention relates to a polyester film having excellent heat-sealing strength, and the polyester film has excellent heat-sealing strength particularly with a polyester film, and therefore may be suitably used for sealant use. Further, a laminate with other film may be formed with the polyester film of the present invention as at least one layer, and a packaging bag may be obtained from the laminate.

The invention claimed is:

1. A laminate comprising a polyester film for a sealant layer and at least one layer other than the polyester film for a sealant layer that is (i) a polyester film formed of a polyester, (ii) a polyolefin film, or (iii) a polyamide film,
   wherein the polyester film for a sealant layer comprises at least one polyester resin comprising (i) ethylene terephthalate as a main structural component and (ii) one or more monomer components that may serve as amorphous components so that the total amount of the monomer components is not less than 12 mol % and not more than 30 mol % among total monomer components, and
   wherein the polyester film for a sealant layer is uniaxially or biaxially stretched, and satisfies the following requirements (1) to (4):
   (1) the heat-sealing strength is not less than 2 N/15 mm and not more than 20 N/15 mm when the polyester films are heat-sealed to each other at 130° C.;
   (2) the heat-sealing strength is not less than 2 N/15 mm and not more than 8 N/15 mm when the polyester film is heat-sealed to a biaxially stretched polyester film formed from a polyester at 130° C.;
   (3) the heat-sealing strength is not less than 2 N/15 mm and not more than 20 N/15 mm when the polyester film is heat-sealed to an unstretched polyester film formed from a polyester at 130° C.; and
   (4) the crystal melting heat capacity $\Delta Hm$ measured by differential scanning calorimetry (DSC) is not less than 10 (J/g) and not more than 40 (J/g).

2. A packaging bag, wherein the laminate according to claim 1 is used as at least a part thereof.

3. The packaging bag according to claim 2, wherein the polyester film for a sealant layer is an innermost layer of the laminate that contacts a content, when present, of the packaging bag.

4. The laminate according to claim 1, wherein the at least one polyester resin comprises (ii) one or more monomer components that may serve as amorphous components so that the total amount of the monomer components is not less than 15 mol % and not more than 30 mol % among total monomer components.

5. A packaging bag, wherein the laminate according to claim 4 is used as at least a part thereof.

6. The packaging bag according to claim 5, wherein the polyester film for a sealant layer is an innermost layer of the laminate that contacts a content, when present, of the packaging bag.

* * * * *